(12) United States Patent
Uenaka

(10) Patent No.: US 7,903,959 B2
(45) Date of Patent: Mar. 8, 2011

(54) DRIVE DEVICE

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 184 days.

(21) Appl. No.: 12/397,379

(22) Filed: Mar. 4, 2009

(65) Prior Publication Data

US 2009/0226157 A1    Sep. 10, 2009

(30) Foreign Application Priority Data

Mar. 6, 2008    (JP) .................................. 2008-055969

(51) Int. Cl.
*G03B 17/00* (2006.01)
*A47L 11/36* (2006.01)
*H02P 1/04* (2006.01)

(52) U.S. Cl. ................................ 396/55; 15/91; 318/443

(58) Field of Classification Search .................... 396/55; 15/91; 318/114, 443
See application file for complete search history.

(56) References Cited

U.S. PATENT DOCUMENTS

| | | | | |
|---|---|---|---|---|
| 4,083,299 A | * | 4/1978 | Norton | 101/93.03 |
| 4,993,098 A | * | 2/1991 | Kharitonov et al. | 15/91 |
| 6,483,226 B1 | * | 11/2002 | Okada | 310/328 |
| 2005/0264656 A1 | | 12/2005 | Seo et al. | |
| 2006/0279638 A1 | * | 12/2006 | Matsuda et al. | 348/208.7 |
| 2008/0037980 A1 | * | 2/2008 | Okumura et al. | 396/535 |
| 2008/0084479 A1 | | 4/2008 | Uenaka | |
| 2008/0084492 A1 | | 4/2008 | Uenaka et al. | |
| 2008/0084505 A1 | | 4/2008 | Uenaka | |
| 2008/0084608 A1 | | 4/2008 | Uenaka | |

FOREIGN PATENT DOCUMENTS

JP    2005-340988    12/2005

OTHER PUBLICATIONS

U.S. Appl. No. 12/397,370 to Uenaka, filed Mar. 4, 2009.
U.S. Appl. No. 12/334,843 to Uenaka, filed Dec. 15, 2008.

* cited by examiner

*Primary Examiner* — W. B. Perkey
(74) *Attorney, Agent, or Firm* — Greenblum & Bernstein, P.L.C.

(57) ABSTRACT

A drive device is provided having a movable part, a fixed part, and a drive part. The fixed part is provided within a movement range of the movable part. The drive part drives the movable part in a first direction so as to strike said fixed part. The drive part drives the movable part to and fro along the first direction alternately for different time intervals so as to strike the fixed part.

8 Claims, 6 Drawing Sheets

DRIVE DEVICE

BACKGROUND OF THE INVENTION

1. Field of the Invention

The present invention relates to a drive device that drives a movable part on which, for example, an image sensor of a camera is attached.

2. Description of the Related Art

A device which is provided in a photographing device such as a digital camera and removes dust particles attached to the camera's image sensor and its cover is proposed.

United States Published Patent Application Publication Number 2005-0264656 A discloses a drive device which vibrates attached dust particles by striking a movable part against a fixed part for a constant interval so as to dislodge the dust particles attached to an image sensor and its cover with the impact of the strike.

However, dust particles vary in weight, but only a constant vibrational frequency is generated by striking a movable part against a fixed part for a constant interval. Therefore, some dust particles may not be removed from an image sensor and its cover by the impact of the strike.

SUMMARY OF THE INVENTION

An object of the present invention is to provide a drive device which efficiently removes dust particles from an image sensor and its cover.

A drive device is provided having a movable part, a fixed part, and a drive part. The fixed part is provided within a movement range of the movable part. The drive part drives the movable part in a first direction so as to strike said fixed part. The drive part drives the movable part to and fro along the first direction alternately for different time intervals so as to strike the fixed part.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
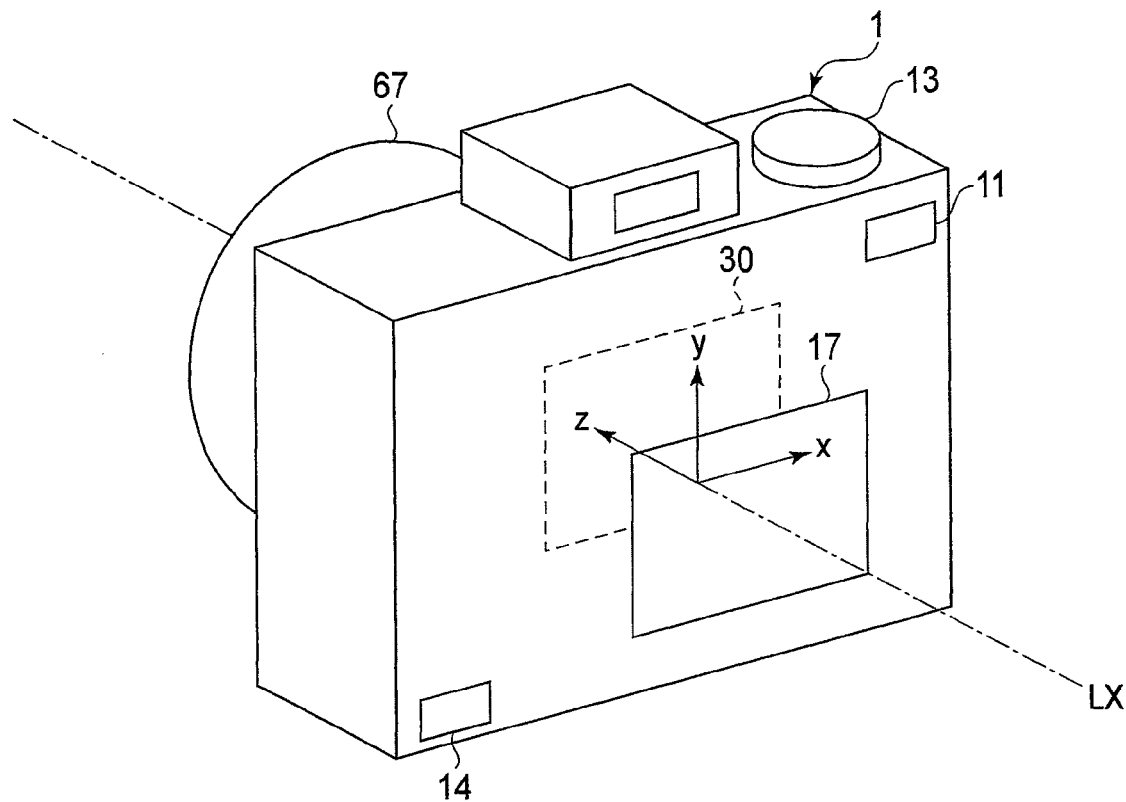
FIG. 1 is a perspective view of the image-capturing device according to the embodiment of the present invention.
Figure 2:
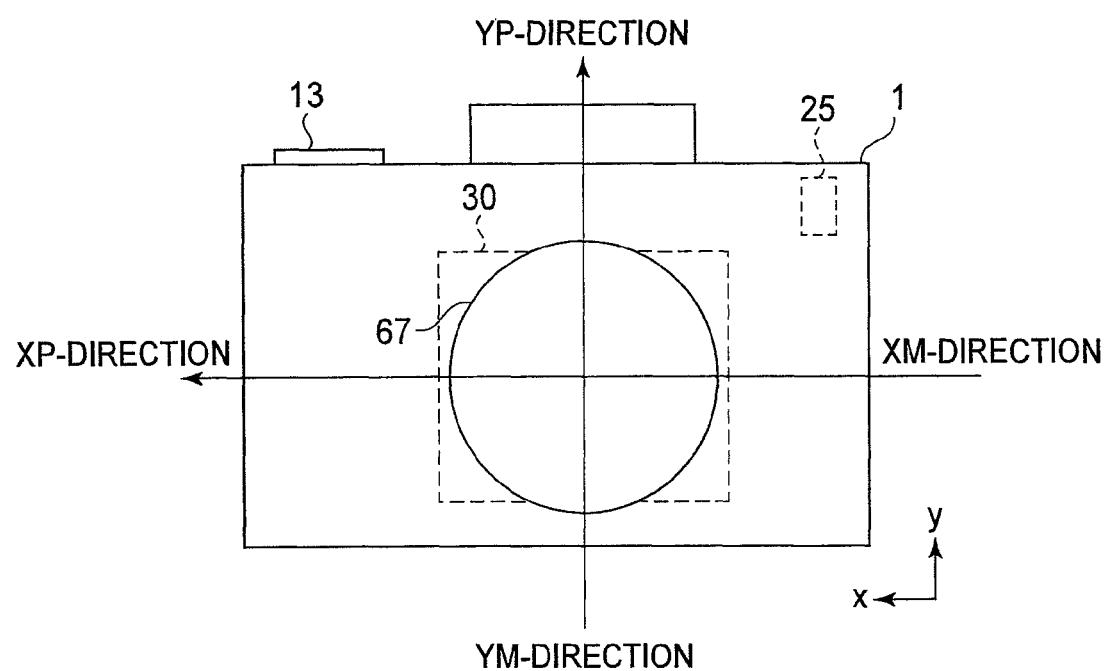
FIG. 2 is a front view of the image-capturing device.
Figure 3:
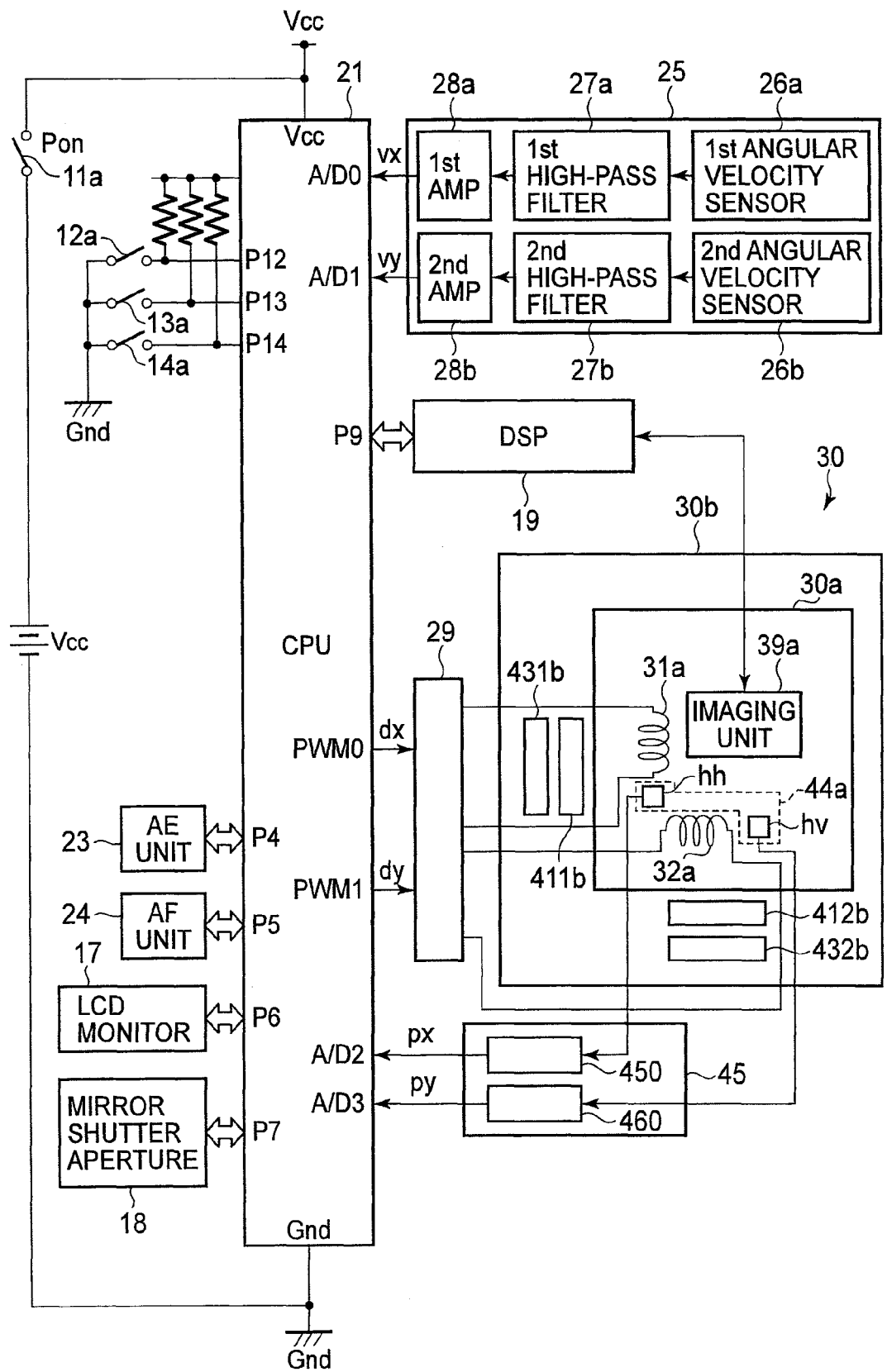
FIG. 3 is a block diagram of the image-capturing device.

The present invention is described below with reference to the embodiment shown in the drawings. FIGS. 1 to 3 show the construction of an image-capturing apparatus 1 which comprises a drive device according to the present embodiment. In this embodiment, the photographing apparatus 1 is a digital camera. A photographing optical system, such as a camera lens 67 etc., that captures an optical image on a photographing surface of the image sensor of the photographing apparatus 1 has an optical axis LX. In order to explain the orientation of the embodiment, an x-direction (the first direction), a y-direction (the second direction), and a z-direction are defined (refer to FIG. 1). The x-direction is in the horizontal plane and perpendicular to the optical axis LX. The y-direction is perpendicular to the optical axis LX and the x-direction. The z-direction is parallel to the optical axis LX and perpendicular to both the x-direction and the y-direction. The positive x-direction is the XP-direction; the negative x-direction is the XM-direction. The positive y-direction is the YP-direction; the negative y-direction is the YM-direction. The positive x-direction is the XP-direction; the negative x-direction is the XM-direction. The positive y-direction is the YP-direction; the negative y-direction is the YM-direction.

The photographing apparatus 1 comprises a power button 11 which is used to turn on or off the power of the photographing apparatus, a release button 13, an anti-shake button 14, an LCD monitor 17, a mirror-aperture-shutter unit 18, a DSP 19, a CPU 21, an AE (automatic exposure) unit 23, an AF (automatic focus) unit 24, an anti-shake unit 30, imaging unit 39a, and a camera lens 67. These components perform the imaging function.

Whether the power switch 11a is in the ON state or the OFF state is determined by the state of the power button 11, so that the ON and OFF states of the photographing apparatus 1 correspond to the ON and OFF states of the power switch 11a. The photographic subject image is captured as an optical image through the camera lens 67 by the imaging unit 39a, and the captured image is displayed on the LCD monitor 17. The photographic subject image can be observed through the optical finder (not depicted).

After the power button 11 is depressed, putting the photographing apparatus 1 in the ON state, a dust-removal operation is performed in a first period (320 ms).

When the release button 13 is partially depressed by the operator, the photometric switch 12a changes to the ON state so that the photometric operation, the AF-sensing operation, and the focusing operation are performed. When the release button 13 is fully depressed by the operator, the release switch 13a changes to the ON state so that the imaging operation by the imaging unit 39a (the imaging apparatus) is performed, and the image is captured and stored.

The mirror-aperture-shutter unit 18 is connected to port P7 of the CPU 21 and performs an UP/DOWN operation of the mirror (a mirror-up operation and a mirror-down operation), an OPEN/CLOSE operation of the aperture, and an OPEN/CLOSE operation of the shutter according to the ON state of the release switch 13a.

The DSP 19 is connected to the imaging unit 39, and port P9 of the CPU 21. Based on a command from the CPU 21, the DSP 19 performs calculations such as image processing, etc., on the image signal obtained by the imaging operation of the imaging unit 39a.

The CPU 21 is a control apparatus that controls each part of the photographing apparatus 1 regarding the imaging operation, the dust-removal operation, and the anti-shake operation (i.e., the image stabilizing operation). The anti-shake operation includes both the movement of the movable part 30a and a position-detection operation. Furthermore, the CPU 21 stores the value of anti-shake parameter IS, the value of release state parameter RP, the value of dust-removal state parameter GP, and the value of dust-removal time parameter CNT.

Anti-shake parameter IS indicates whether the photographing apparatus 1 is in the anti-shake mode. When the anti-shake parameter IS equals one, the photographing apparatus 1 is in the anti-shake mode; when it equals zero, the photographing apparatus 1 is not in the anti-shake mode.

The value of the release state parameter RP changes with respect to the release sequence operation. When the release sequence operation is performed, the value of the release state parameter RP is set to one (refer to steps S24 to S31 in FIG. 4); and when the release sequence operation is finished, the value of the release state parameter RP is set (reset) to zero (refer to steps S13 and S32 in FIG. 4).

The dust-removal state parameter GP indicates whether the dust-removal operation is finished. The value of the dust-removal state parameter GP is set to one because the dust-removal operation may be considered underway from the moment immediately after the photographing apparatus 1 is set to the ON state until the first period (320 ms) has elapsed (refer to step S14 in FIG. 4).

Figure 4:
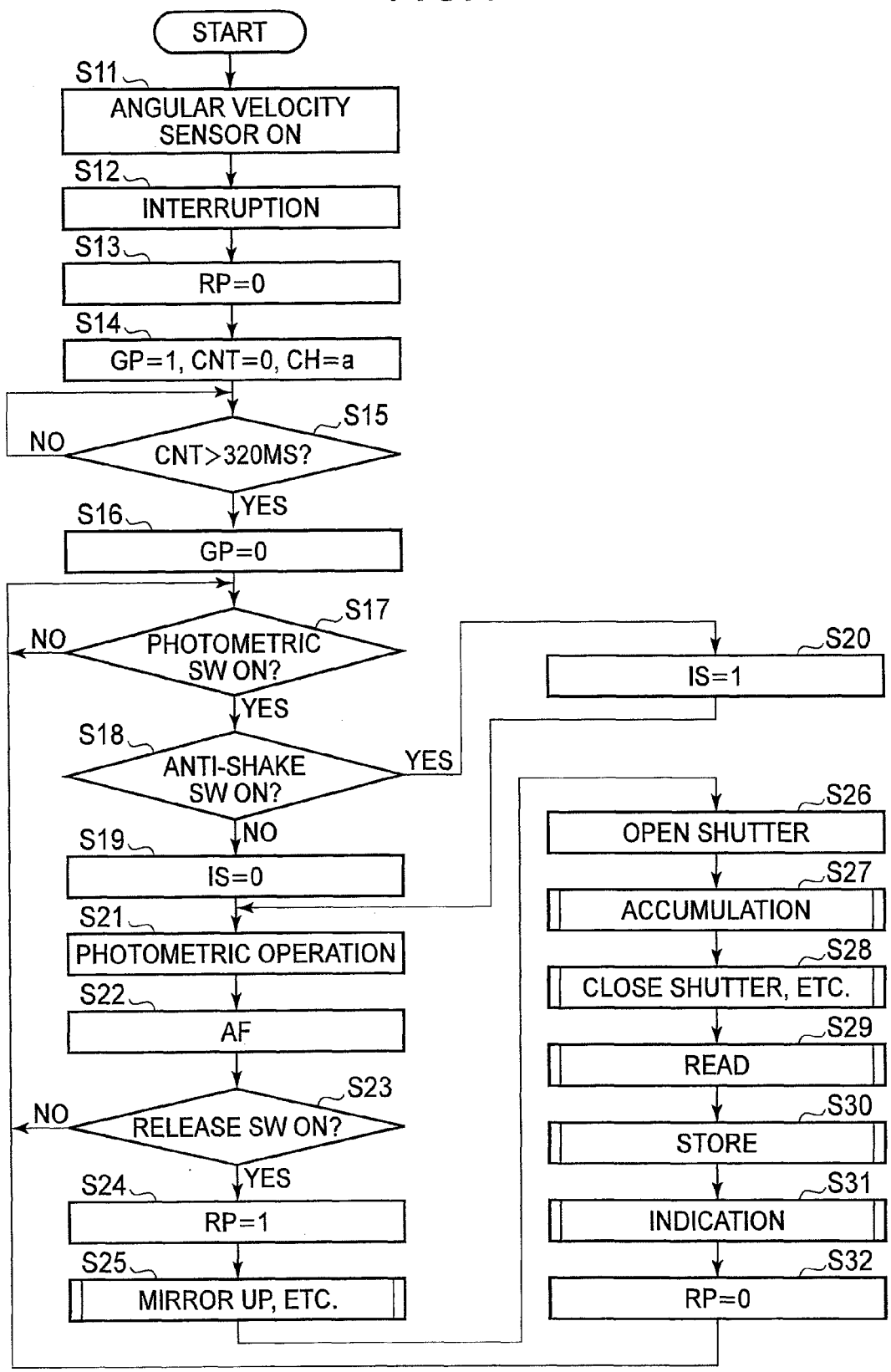
FIG. 4 is a flowchart showing a main process of the image-capturing device.

The value of the dust-removal state parameter GP is set to zero because the dust-removal operation may be considered to be finished from the moment when the first period (320 ms) has elapsed after the photographing apparatus 1 is set to the ON state (refer to step S16 in FIG. 4).

The dust-removal time parameter CNT is used for measuring the length of time the dust-removal operation is underway. The initial value of the dust-removal time parameter CNT is substituted by zero. While the dust-removal operation is being performed, the value of the dust-removal time parameter CNT is increased by one at every time interval of 1 ms (refer to step S701 in FIG. 6).

Figure 7:
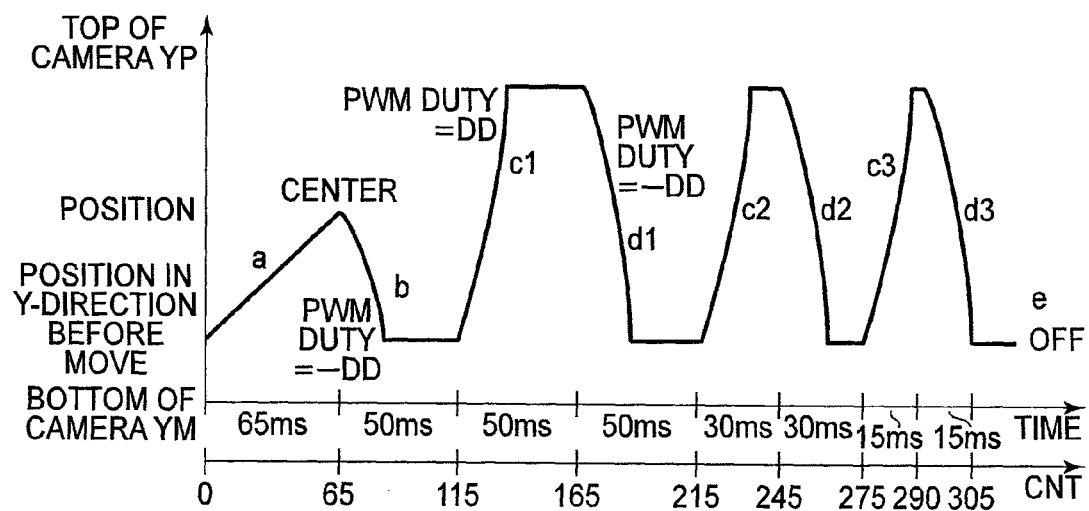
FIG. 7 shows the trajectory of the movable part in the y-direction during the dust-removal process.
Figure 8:
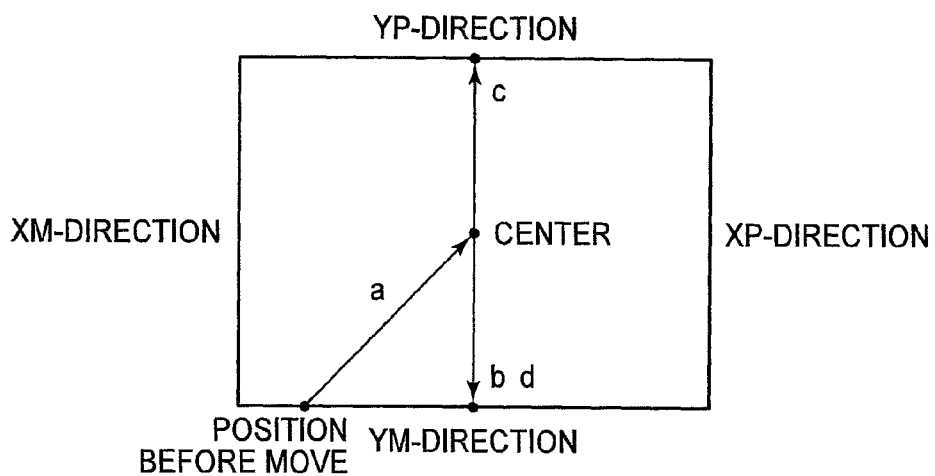
FIG. 8 schematically shows the trajectory of the movable part watching an imaging device from the lens side.

The CPU 21 moves the movable part 30a to a predetermined initial position in the dust-removal operation before the anti-shake operation. This operation is named the centering operation (refer to step S84 in FIG. 7). In this embodiment, the predetermined position is the center of the movement range (where the coordinate values in the x-direction and in the y-direction are both 0).

Then, the center of mass of the movable part 30a is kept at a certain position relative to the x-direction by the CPU 21. The XP-side of the movable part 30a is driven in the YP-direction of the y-direction, and the XM-side of the movable part 30a is driven in the YM-direction at the same time. Therefore, the movable part 30a swings relative to a given axis, so that the XP-end of the YP-side of the movable part 30a strikes the upper boundary 34a of the movable range and the XM-end of the YM-side of the movable part 30a strikes the lower boundary 34b of the movable range.

Then, the XP-side of the movable part 30a is driven in the YM-direction of the y-direction, and the XM-side is simultaneously driven in the YP-direction, while the movable part 30a is kept at a certain position concerning to the x-direction. Therefore, the movable part 30a swings in the direction opposite to last swing, so that the XM-end of the YP-side strikes the upper boundary 34a of the movable range and the XP-end of the YM-side strikes the lower boundary 34b of the movable range. After repeating these processes, the dust-removal operation ends.

The dust particles on the imaging unit 39a of the movable part 30a (the image sensor and the low-pass filter) are removed by the shock of the impact of the movable part 30a against the boundary of said movable range. After the dust-removal operation is completed, the anti-shake operation begins.

Next, the CPU 21 stores the values of a first digital angular velocity signal Vxn, a second digital angular velocity signal Vyn, a first digital angular velocity VVxn, a second digital angular velocity VVyn, a first digital displacement angle Bxn, a second digital displacement angle Byn, the coordinate of position Sn in the x-direction, Sxn; the coordinate of position Sn in the y-direction, Syn; the first driving force, Dxn; the second driving force, Dyn; the coordinate of position Pn after A/D conversion in the x-direction, pdxn; the coordinate of position Pn after A/D conversion in the y-direction, pdyn; a first subtraction value, exn; a second subtraction value, eyn; a first proportional coefficient, Kx; a second proportional coefficient, Ky; a sampling cycle θ of the anti-shake operation; a first integral coefficient, Tix; a second integral coefficient, Tiy; a first differential coefficient, Tdx; and a second differential coefficient, Tdy.

The AE unit 23 (an exposure calculating unit) performs the photometric operation and calculates the photometric values, based on the subject being photographed. The AE unit 23 also calculates the aperture value and the duration of the exposure, with respect to the photometric values, both of which are needed for imaging. The AF unit 24 performs the AF-sensing operation and the corresponding focusing operation, both of which are also needed for imaging. In the focusing operation, the camera lens 67 is moved along the optical axis LX.

The anti-shake part (the anti-shake apparatus) of the photographing apparatus 1 comprises an anti-shake button 14, an anti-shake switch 14a, an LCD monitor 17, a CPU 21, an angular velocity detection unit 25, a driver circuit 29, an anti-shake unit 30, a hall-element signal-processing unit 45 (a magnetic-field change-detecting element), and the camera lens 67.

When the anti-shake button 14 is depressed by the operator, the anti-shake switch 14a is set to the ON state. When the anti-shake switch 14a is in the ON state, the photographing apparatus 1 is in the anti-shake mode, and the anti-shake parameter IS is set to one (IS=1). When the anti-shake switch 14a is not in the ON state, the photographing apparatus 1 is in the non-anti-shake mode, and the anti-shake parameter IS is set to zero (IS=0). In the anti-shake mode, the anti-shake operation is executed. In the anti-shake operation, the angular velocity detection unit 25 and the anti-shake unit 30 are driven for the second period independent of other operation, such as the photometry operation. In this embodiment, the value of the predetermined time interval is set to 1 ms.

The CPU 21 controls the various output commands corresponding to the input signals from these switches. The port P12 of the CPU 21 receives a 1-bit digital signal indicating whether the photometric switch 12a is in the ON state or the OFF state. The port P13 of the CPU 21 receives a 1-bit digital signal indicating whether the release switch 13a is in the ON state or the OFF state. The port P14 of the CPU 21 receives a 1-bit digital signal indicating whether the anti-shake switch 14a is in the ON state or the OFF state. The AE unit 23, the AF unit 24, and the LCD monitor 17 are respectively connected to port P4, P5 and P6 of the CPU 21 for I/O.

Next, the details of the angular velocity detection unit 25, the driver circuit 29, the anti-shake unit 30, and the hall-element signal-processing unit 45 are described.

The angular velocity detection unit 25 has a first angular velocity sensor 26a, a second angular velocity sensor 26b, a first high-pass filter circuit 27a, a second high-pass filter circuit 27b, a first amplifier 28a and a second amplifier 28b.

The first angular velocity sensor 26a detects the angular velocity of a rotary motion (the yawing) of the photographing apparatus 1 about the axis of the y-direction, i.e., it detects the velocity component in the x-direction of the angular velocity of the photographing apparatus 1. The first angular velocity sensor 26a is a gyro sensor that detects the yaw angular velocity.

The second angular velocity sensor 26b detects the angular velocity of a rotary motion (the pitch) of the photographing apparatus 1 about the axis of the x-direction i.e., detects the velocity component in the y-direction of the angular velocity of the photographing apparatus 1. The second angular velocity sensor 26b is a gyro sensor that detects a pitch angular velocity.

The first high-pass filter circuit 27a reduces a low-frequency component of the signal output from the first angular velocity sensor 26a, because the low-frequency component of the signal output from the first angular velocity sensor 26a includes signal elements that are based on a null voltage and panning motion, neither of which are related to camera shake. The second high-pass filter circuit 27b reduces a low-frequency component of the signal output from the second angular velocity sensor 26b, because the low-frequency component of the signal output from the second angular velocity sensor 26b includes signal elements that are based on a null voltage and panning motion, neither of which are related to camera shake. The processes performed by the first and second high-pass filter circuit 27a and 27b are analog high-pass filter processes.

The first amplifier 28a amplifies a signal related to the yawing angular velocity, whose low-frequency component has been reduced, and outputs the analog signal to the port A/D0 of the CPU 21 as a first angular velocity vx. The second amplifier 28b amplifies a signal relating to the pitch angular velocity, whose low-frequency component has been reduced, and outputs the analog signal to the port A/D1 of the CPU 21 as a second angular velocity vy.

The reduction of the low-frequency signal component is a two-step process; the primary part of the analog high-pass filter process is performed first by the first and second high-pass filter circuits 27a and 27b, followed by the secondary part of the digital high-pass filter process that is performed by the CPU 21. The cut-off frequency of the secondary part of the digital high-pass filter process is higher than that of the primary part of the analog high-pass filter process. In the digital high-pass filter process, the value of a time constant (a first high-pass filter time constant hx and a second high-pass filter time constant hy) can be easily changed.

The supply of electrical power to the CPU 21 and all parts of the angular velocity detection unit 25 begins after the power switch 11a is set to the ON state (i.e., the main power supply is set to the ON state). The calculation of a camera-shake value begins after the power switch 11a is set to the ON state and the dust-removal operation is finished.

The CPU 21 converts the first and second angular velocities vx and vy, which are respectively input to the ports A/D0 and A/D1, to a first and second digital angular velocity signals Vxn and Vyn. It then calculates first and second digital angular velocities VVxn and VVyn by reducing a low-frequency component of the first and second digital angular velocity signals Vxn and Vyn (the digital high-pass filter process) because the low-frequency component of the first and second digital angular velocity signals Vxn and Vyn include signal elements that are based on a null voltage and panning motion, neither of which are related to camera shake. Moreover, it calculates a camera-shake displacement angle (the first and second digital displacement angles Bxn and Byn) by integrating the first and second digital angular velocities VVxn and VVyn (the integration process).

The CPU 21 and the angular velocity detection unit 25 use a function to calculate the camera-shake value.

"n" is an integer greater than zero and indicates the length of time (ms) from the commencement of the timer interruption process, (t=0; refer to step S12 in FIG. 4), to the point when the latest anti-shake operation is performed (t=n).

In the digital high-pass filter process regarding the x-direction, the first digital angular velocity VVxn is calculated by dividing the summation of the first digital angular velocities VVx0 to VVxn−1 (calculated by the timer interruption process before the 1 ms predetermined time interval; i.e., before the latest anti-shake operation was performed), by the first high-pass filter time constant hx, and then subtracting the resulting quotient from the first digital angular velocity signal Vxn (VVxn=Vxn−(ΣVVxn−1)÷hx). In the digital high-pass filter process regarding the y-direction, the second digital angular velocity VVyn is calculated analogously to VVxn to give (VVyn=Vyn−(ΣVVyn−1)÷hy).

In this embodiment, the angular velocity detection operation in (a portion of) the timer interruption process includes the processing by the angular velocity detection unit 25 and the process of inputting the first and second angular velocities vx and vy from the angular velocity detection unit 25 to the CPU 21.

In the integration process regarding the x-direction, the first digital displacement angle Bxn is calculated by summing from the first digital angular velocity VVx0 at the point when the timer interruption process commences (t=0; refer to step S12 in FIG. 4), to the first digital angular velocity VVxn at the point when the latest anti-shake operation is performed (t=n; Bxn=ΣVVxn).

Similarly, in the integration process regarding the y-direction, the second digital displacement angle Byn is calculated by summing from the second digital angular velocity VVy0 at the point when the timer interruption process commences, to the second digital angular velocity VVyn at the point when the latest anti-shake operation is performed (Byn=ΣVVyn).

The CPU 21 calculates the position Sn where the imaging unit 39a (the movable part 30a) should be moved, corresponding to the camera-shake value (the first and second digital displacement angles Bxn and Byn) that is calculated for the x-direction and the y-direction on the basis of a position conversion coefficient zz (a first position conversion coefficient zx for the x-direction and a second position conversion coefficient zy for the y-direction).

The coordinate of position Sn in the x-direction is defined as Sxn, and in the y-direction as Syn. The movement of the movable part 30a, which includes the imaging unit 39a, is performed using electromagnetic force, and is described later.

The driving force Dn drives the driver circuit 29 in order to move the movable part 30a to the position Sn. The coordinate of the driving force Dn in the x-direction is defined as the first driving force Dxn (after D/A conversion: a first PWM duty dx). The coordinate of the driving force Dn in the y-direction is defined as the second driving force Dyn (after D/A conversion: a second PWM duty dy). A first driving coil 31a is driven according to the value of the first driving force Dxn. A second driving coil 32a is driven according to the second driving force Dyn.

The first PWM duty dx is the duty ratio of the driving pulse corresponding to the first driving force Dxn. The second PWM duty dy is the duty ratio of the driving pulse corresponding to the second driving force Dyn.

The value of second driving force Dyn is represented by +DD or −DD. +DD indicates that the movable part 30a is driven in the positive y-direction (YP-direction), i.e., towards the upper end of the fixed part 30b. −DD indicates that the movable part 30a is driven in the negative y-direction (YM-direction), i.e., towards the bottom end of the fixed part 30b.

Figure 6:
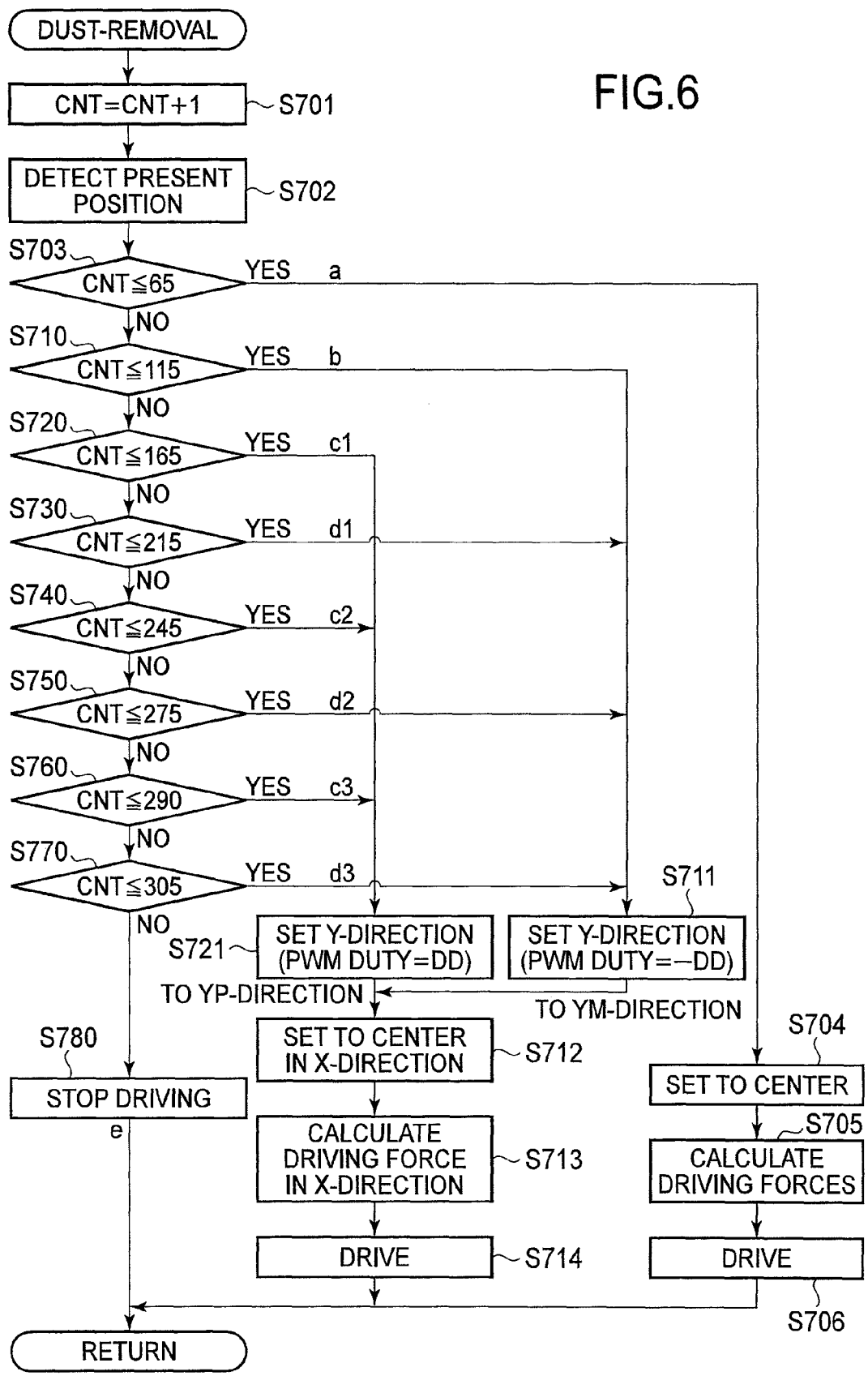
FIG. 6 is a flowchart showing a dust-removal process.

However, the position Sn, where the imaging unit 39a (the movable part 30a) should be moved in the first period (320 ms) for the dust-removal operation before the anti-shake operation is performed, is set to "a" value that does not correspond to the camera shake value (refer to step S704 in FIG. 6).

For example, the position Sn is set on the center of the fixed part 30b in the "a" trajectory of the dust-removal operation. Therefore, the movable part 30a is set on the center of the fixed part 30b. In the "b" to "d" trajectories of the dust-removal operation, the x-direction component of the position Sn is set at a certain value, but in the y-direction, only the PWM duty is set and the y-direction component of the position Sn is not set. Thus, the movable part 30a is moved towards the top or bottom of the fixed part 30b by constant force, and strikes it.

In a positioning operation along the x-direction, the coordinate of position Sn in the x-direction is defined as Sxn, and is the product of the latest first digital displacement angle Bxn and the first position conversion coefficient zx (Sxn=zx×Bxn).

In a positioning operation along the y-direction, the coordinate of position Sn in the y-direction is defined as Syn, and is the product of the latest second digital displacement angle Byn and the second position conversion coefficient zy (Syn=zy×Byn).

The anti-shake unit 30 corrects for camera shake by repeatedly moving the imaging unit 39a to position Sn. This stabilizes the photographing subject image displayed on the imaging surface of the image sensor during the exposure time when the anti-shake operation is performed (IS=1).

The anti-shake unit 30 has a fixed part 30b that forms the boundary of the movement range of the movable part 30a, and the movable part 30a which includes the imaging unit 39a and can be moved on the xy plane. The movement range is wider than the shake-correction area in which the movable part 30a is moved during the anti-shake operation.

During the exposure time when the anti-shake operation is not performed (IS=0), the movable part 30a is held in the predetermined position. The predetermined position is the center of the movement range.

In the first period (320 ms), after the photographing apparatus 1 is set to the ON state, the movable part 30a is driven to the predetermined position (i.e., the center of the movement range). Next, the movable part 30a is driven against the boundary of the movement range in the y-direction.

Otherwise (except for the first period and the exposure time), the movable part 30a is not driven.

The anti-shake unit 30 does not have a fixed-positioning mechanism that maintains it in a fixed position when it is not being driven (i.e., the drive OFF state).

The driving of the movable part 30a of the anti-shake unit 30, including the movement to a predetermined fixed position, is performed by the electromagnetic force of the coil and magnetic units for driving, by action of the driver circuit 29 which has first PWM duty dx input from the PWM0 of the CPU 21 and second PWM duty dy input from the PWM1 of the CPU 21.

The movable part 30a of the anti-shake unit 30 is driven by the electromagnetic force created by the coil and magnet units. The electromagnetic force is generated when the driver circuit 29 energizes the coil units. The driver circuit 29 energizes a first driving coil 31a when receiving first PWM duty dx output by the PWM0 of the CPU 21, and a second driving coil 32a when receiving second PWM duty dy output by the PWM1.

The position Pn of the movable part 30a, either before or after the movement effected by the driver circuit 29, is detected by the hall element 44a and the hall-element signal-processing unit 45.

Information regarding the first coordinate of the detected position Pn in the x-direction, in other words the first detected position signal px, is input to the A/D converter A/D2 of the CPU 21 (refer to (2) in FIG. 6). The first detected position signal px is an analog signal that is converted to a digital signal by the A/D converter A/D2 (A/D conversion). Through the A/D conversion, analog px becomes digital pdxn.

Similarly, regarding the y-direction, py is input to the A/D converter A/D3 of the CPU 21. Through the A/D conversion, analog py is becomes digital pdyn.

The PID (Proportional Integral Differential) control procedure calculates the first and second driving forces Dxn, Dyn on the basis of the coordinate data for the detected position Pn (pdxn, pdyn) and the position Sn (Sxn, Syn) following movement.

The calculation of the first driving force Dxn is based on the first subtraction value exn, the first proportional coefficient Kx, the sampling cycle θ, the first integral coefficient Tix, and the first differential coefficient Tdx (Dxn=Kx×{exn+θ÷Tix×Σexn+Tdx÷θ×(exn−exn−1)}). The first subtraction value exn is calculated by subtracting the first coordinate of the detected position Pn in the x-direction after the A/D conversion, pdxn, from the coordinate of position Sn in the x-direction, Sxn (exn=Sxn−pdxn).

The calculation of the second driving force Dyn is based on the second subtraction value eyn, the second proportional coefficient Ky, the sampling cycle θ, the second integral coefficient Tiy, and the second differential coefficient Tdy (Dyn=Ky×{eyn+θ÷Tiy×Σeyn+Tdy÷θ×(eyn−eyn−1)}). The second subtraction value eyn is calculated by subtracting the second coordinate of the detected position Pn in the y-direction after the A/D conversion, pdyn, from the coordinate of position Sn in the y-direction, Syn (eyn=Syn−pdyn).

The value of the sampling cycle θ is set to the predetermined time interval of 1 ms (the second period).

The movable part 30a is driven to the position Sn (Sxn, Syn) by the anti-shake operation of the PID control procedure, when the photographing apparatus 1 is set to the anti-shake mode (IS=1) by the setting of the anti-shake switch 14a to the ON state. The position Sn is determined by the PID control procedure comprised in the anti-shake operation.

When the anti-shake parameter IS is zero, the PID control procedure not comprised in the anti-shake operation is performed so that the movable part 30a is moved to the center of the movement range (the predetermined position).

In the dust-removal operation, from the point when the photographing apparatus 1 is set to the ON state until the anti-shake operation commences, the movable part 30a is first moved to the center of the movement range. After that, the movable part 30a is driven according to the processes described herein before.

The movable part 30a has a coil unit for driving that is comprised of a first driving coil 31a, a second driving coil 32a, an imaging unit 39a that has the image sensor, and a hall element 44a acting as a magnetic-field change-detecting element. In the first embodiment, the image sensor is a CCD; however, the image sensor may be another image sensor such as a CMOS etc.

The rectangular form of the imaging surface of the image sensor has two sides parallel to the x-direction and two sides parallel to the y-direction that are shorter than those of the x-direction. Accordingly, the movement range of the movable part 30a in the x-direction is greater than in the y-direction.

The fixed part 30b has a magnetic unit for driving that is comprised of a first position-detecting and driving magnet 411b, a second position-detecting and driving magnet 412b, a first position-detecting and driving yoke 431b, and a second position-detecting and driving yoke 432b.

The fixed part 30b movably supports the movable part 30a in the x-direction and in the y-direction.

The fixed part 30b has a buffer member that absorbs the shock at the point of contact the movable part 30a (at the boundary of the movement range).

The hardness of the buffer member is chosen such that the part making contact, such as the movable part 30a, is not damaged by the shock of the impact, but any dust on the movable part 30a will be removed by the shock of the impact with the buffer member.

In the first embodiment, the buffer member is attached to the fixed part 30b; however, the buffer member may be attached to the movable part 30a.

When the movable part 30a is positioned at the center of its movement range in both the x-direction and the y-direction, the center of the image sensor intersects the optical axis LX of the camera lens 67, and the full imaging range of the image sensor may be utilized.

The rectangle shape, which is the form of the imaging surface of the image sensor, has two diagonal lines. In the first embodiment, the center of the image sensor is at the intersection of these two diagonal lines.

The first driving coil 31a, the second driving coil 32a, and the hall element 44a are attached to the movable part 30a.

The first driving coil 31a is formed in a sheet and a spiral and has magnetic field lines in the y-direction, thus creating the first electromagnetic force for moving the movable part 30a which includes the first driving coil 31a, in the x-direction.

The first electromagnetic force occurs on the basis of the current direction of the first driving coil 31a and the magnetic-field direction of the first position-detecting and driving magnet 411b.

The second driving coil 32a is formed in a sheet and a spiral and has magnetic field lines in the x-direction, thus creating the second electromagnetic force for moving the movable part 30a which includes the second driving coil 32a in the y-direction.

The second electromagnetic force occurs on the basis of the current direction of the second driving coil 32a and the magnetic-field direction of the second position-detecting and driving magnet 412b.

The first and second driving coils 31a and 32a are connected to the driver circuit 29 which drives the first and second driving coils 31a and 32a through a flexible circuit board (not depicted). The first PWM duty dx is input to the driver circuit 29 from the PWM0 of the CPU 21. Similarly, the second PWM duty dy is input to the driver circuit 29 from the PWM1 of the CPU 21. The driver circuit 29 supplies power to the first driving coil 31a corresponding to the value of the first PWM duty dx, and to the second driving coil 32a that corresponding to the value of the second PWM duty dy in order to drive the movable part 30a.

The first and second position-detecting and driving yoke 431b and 432b are made of a soft, magnetic material, and provided on the fixed part 30b.

The first position-detecting and driving yoke 431b prevents the magnetic-field of the first position-detecting and driving magnet 411b from dissipating to the surroundings, and raises the magnetic-flux density between the first position-detecting and driving magnet 411b and the first driving coil 31a, and between the first position-detecting and driving magnet 411b and the horizontal hall element hh.

Similarly, the second position-detecting and driving yoke 432b prevents the magnetic-field of the second position-detecting and driving magnet 412b from dissipating to the surroundings, and raises the magnetic-flux densities between the second position-detecting and driving magnet 412b and the second driving coil 32a, between the second position-detecting and driving magnet 412b and the first vertical hall element hv.

The first position-detecting and driving magnet 411b is attached to the movable part side of the fixed part 30b, where the first position-detecting and driving magnet 411b faces the first driving coil 31a and the horizontal hall element hh in the z-direction. In detail, the first position-detecting and driving magnet 411b is attached to the first position-detecting and driving yoke 431b. The first position-detecting and driving yoke 431b is attached to the fixed part 30b on the side of the movable part 30a in the z-direction. The N pole and S pole of the first position-detecting and driving magnet 411b are arranged in the x-direction.

Similarly, the second position-detecting and driving magnet 412b is attached to the movable part side of the fixed part 30b, where the second position-detecting and driving magnet 412b faces respectively the second driving coil 32a and the vertical hall element hv in the z-direction. In detail, the second position-detecting and driving magnet 412b is attached to the second position-detecting and driving yoke 432b. The second position-detecting and driving yoke 432b is respectively attached to the fixed part 30b on the side of the movable part 30a in the z-direction. The N pole and S pole of the second position-detecting and driving magnet 412b are arranged in the y-direction.

The hall element 44a comprises a horizontal hall element hh which detects the coordinate of the position Pn of the movable part 30a in the x-direction, and a vertical hall element hv which detects the coordinate of the XM-side of the movable part 30a in the y-direction. Each hall element are single-axis units that contain magneto-electric converting elements (magnetic-field change-detecting elements) utilizing the Hall Effect. The horizontal hall element hh outputs the first detected position signal px which indicates the present position Pn of the movable part 30a. Similarly, the vertical hall element hv respectively output the second detected position signal py.

The horizontal hall element hh is attached to the movable part 30a where the horizontal hall element hh faces the first position-detecting and driving magnet 411b in the z-direction. Similarly, the vertical hall element hv is attached to the movable part 30a where is faces the second position-detecting and driving magnet 412b in the z-direction.

When the center of the image sensor is intersecting the optical axis LX, it is desirable to have the horizontal hall element hh positioned on the hall element 44a facing an intermediate area between the N pole and S pole of the first position-detecting and driving magnet 411b in the x-direction, as viewed from the z-direction. In this position, the horizontal hall element hh utilizes the maximum range in which an accurate position-detecting operation can be performed based on the linear output change (linearity) of the single-axis hall element. Similarly, when the center of the image sensor is intersecting the optical axis LX, it is desirable to have the vertical hall element hv positioned on the hall element 44a facing an intermediate area between the N pole and S pole of the second position-detecting and driving magnet 412b in the y-direction, as viewed from the z-direction.

The hall-element signal-processing unit 45 has a first hall-element signal-processing circuit 450, and a second hall-element signal-processing circuit 460.

The first hall-element signal-processing circuit 450 detects a horizontal potential difference x10 between the output terminals of the horizontal hall element hh. The horizontal potential difference x10 is detected with an output signal of the horizontal hall element hh. The first hall-element signal-processing circuit 450 outputs the first detected position signal px, which specifies the first coordinate of the position Pn of the movable part 30a in the x-direction, to the A/D converter A/D2 of the CPU 21, on the basis of the horizontal potential difference x10.

Similarly, the second hall-element signal-processing circuit 460 detects a vertical potential difference y10 between the output terminals of the vertical hall element hv. The vertical potential difference y10 is detected with an output signal of the vertical hall element hv. After that, the second hall-element signal-processing circuit 460 outputs the second detected position signal py to the A/D converter A/D3 of the CPU 21.

Next, the main process of the photographing apparatus 1 in the first embodiment is explained using the flowchart of FIG. 4.

When the photographing apparatus 1 is set to the ON state, electrical power is supplied to the angular velocity detection unit 25 so that the angular velocity detection unit 25 is set to the ON state in step S11.

In step S12, the timer interruption process at the predetermined time interval (1 ms) commences. In step S13, the value of the release state parameter RP is set to zero. The detail of the timer interruption process is explained later using the flowchart of FIG. 5.

In step S14, the value of the dust-removal state parameter GP is set to one; the value of the dust-removal time parameter CNT is set to zero; and the channel parameter is set to a.

In step S15, it is determined whether the value of the dust-removal time parameter CNT is greater than 320 ms. Step S15 is provided to wait until the end of the timer interruption process. The dust-removal time parameter CNT is the time that is need so that the timer interruption process is finished. In this embodiment, in consideration of the completion time of the timer interruption process and individual differences in anti-shake units 30, 320 ms is used.

In step S15, it is determined whether the value of the dust-removal time parameter CNT is greater than 320 ms. When it is determined that the value of the dust-removal time parameter CNT is greater than 320 ms, the process continues to step S16; otherwise, the process in step S15 is repeated.

In step S16, the value of the dust-removal state parameter GP is set to 0.

In step S17, it is determined whether the photometric switch 12a is set to the ON state. When it is determined that the photometric switch 12a is set to the ON state, the process continues to step S18; otherwise, the process in step S17 is repeated.

In step S18, it is determined whether the anti-shake switch 14a is set to the ON state. When it is determined that the anti-shake switch 14a is not set to the ON state, the value of the anti-shake parameter IS is set to zero in step S19; otherwise, the value of the anti-shake parameter IS is set to one in step S20.

In step S21, the AE sensor of the AE unit 23 is driven, the photometric operation is performed, and the aperture value and exposure time are calculated.

In step S22, the AF sensor and the lens control circuit of the AF unit 24 are driven to perform the AF sensing and focusing operations, respectively.

In step S23, it is determined whether the release switch 13a is set to the ON state. When the release switch 13a is not set to the ON state, the process returns to step S17 and the process in steps S17 to S22 is repeated; otherwise, the process continues to step S24 and the release-sequence operation commences.

In step S24, the value of the release state parameter RP is set to one. In step S25, the mirror-up operation and the aperture closing operation corresponding to the aperture value that is either preset or calculated, are performed by the mirror-aperture-shutter unit 18.

After the mirror-up operation is finished, the opening operation of the shutter (the movement of the front curtain of the shutter) commences in step S26.

In step S27, the exposure operation, or in other words the electrical charge accumulation of the image sensor (CCD etc.), is performed. After the exposure time has elapsed, the closing operation of the shutter (the movement of the rear curtain of the shutter), the mirror-down operation, and the opening operation of the aperture are performed by the mirror-aperture-shutter unit 18 in step S28.

In step S29, the electrical charge which has accumulated in the image sensor during the exposure time is read. In step S30, the CPU 21 communicates with the DSP 19 so that the imaging process is performed based on the electrical charge read from the image sensor. The image, on which the image process is performed, is stored in the memory of the photographing apparatus 1. In step S31, the image that is stored in the memory is displayed on the LCD monitor 17. In step S32, the value of the release state parameter RP is set to zero, and the release sequence operation is finished. After that, the process then returns to step S17. In other words, the photographing apparatus 1 is set to a state where the next imaging operation can be performed.

Next, the timer interruption process, which commences in step S12 in FIG. 4 and is performed at every 1 ms time interval, is described with reference to the flowchart in FIG. 5.

When the timer interruption process commences, it is determined whether the value of the dust-removal state parameter GP is set to one in step S50. When it is determined that the value of the dust-removal state parameter GP is set to one, the process continues to step S51; otherwise, the process proceeds directly to step S52.

In step S51, the dust-removal process is performed. The detail of the dust-removal process is explained later using the flowchart of FIG. 6.

In step S52, the first angular velocity vx, which is output from the angular velocity detection unit 25, is input to the A/D converter A/D0 of the CPU 21 and converted to the first digital angular velocity signal $Vx_n$. The second angular velocity vy, which is also output from the angular velocity detection unit 25, is input to the A/D converter A/D1 of the CPU 21 and converted to the second digital angular velocity signal $Vy_n$ (the angular velocity detection process).

The low frequencies of the first and second digital angular velocity signals $Vx_n$ and $Vy_n$ are reduced in the digital high-pass filter process (the first and second digital angular velocities $VVx_n$ and $VVy_n$).

In step S53, it is determined whether the value of the release state parameter RP is set to one. When it is determined that the value of the release state parameter RP is not set to one, the driving control of the movable part 30a is set to the OFF state. In other words, the anti-shake unit 30 is set to a state where the driving control of the movable part 30a is not performed in step S54; otherwise, the process proceeds directly to step S55.

In step S55, the first and second detected position signals px and py are input to the CPU 21 thorough the A/D converters A/D2 and A/D3, and also converted to digital signals. The CPU 21 determines the present position Pn (pdxn, pdyn) of the movable part 30a with the input signals.

In step S56, it is determined whether the value of the anti-shake parameter IS is zero. When it is determined that the value of the anti-shake parameter IS is zero, (in other words when the photographing apparatus is not in anti-shake mode), the position Sn (Sxn, Syn) where the movable part 30a (the imaging unit 39a) should be moved is set to the center of the movement range of the movable part 30a, in step S57. When it is determined that the value of the anti-shake parameter IS is not zero (IS=1), (in other words when the photographing apparatus is in anti-shake mode), the position Sn (Sxn, Syn) where the movable part 30a (the imaging unit 39a) should be moved is calculated on the basis of the first and second angular velocities vx and vy, in step S58.

In step S59, the first driving force Dxn (the first PWM duty dx), and the second driving force Dyn (the second PWM duty dyl) of the driving force Dn that moves the movable part 30a to the position Sn are calculated on the basis of the position Sn (Sxn, Syn) that was determined in step S57 or step S58, and the present position Pn (pdxn, pdyn).

In step S60, the first driving coil unit 31a is driven by applying the first PWM duty dx to the driver circuit 29, and the second driving coil unit 32a is driven by applying the second PWM duty dy to the driver circuit 29, so that the movable part 30a is moved to position Sn (Sxn, Syn).

The process of steps S59 and S60 is an automatic control calculation that is used with the PID automatic control for performing general proportional, integral, and differential calculations.

Figure 5:
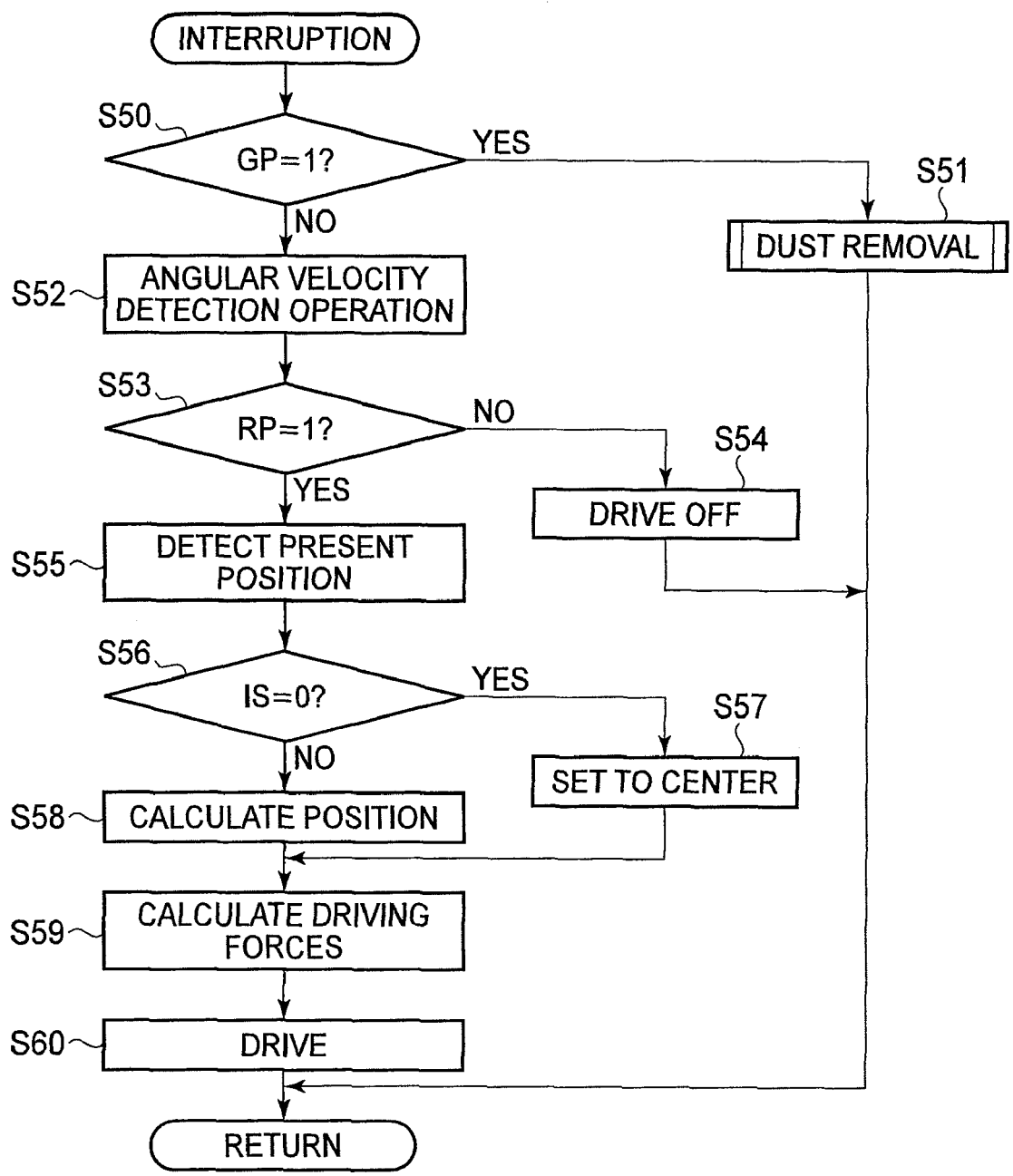
FIG. 5 is a flowchart showing an interrupting process.

Next, the dust-removal process, which commences in step S51 in FIG. 5, is explained using the flowchart in FIGS. 6 to 9.

When the dust-removal process commences, the value of the dust-removal time parameter CNT is increased by one in step S701.

In step S702, the hall element 44a detects the position of the movable part 30a, and the first and second detected position signals px and py are calculated by the hall-element signal-processing unit 45. The first detected position signal px is then input to the A/D converter A/D2 of the CPU 21 and converted to a digital signal $pdx_n$, while the second detected position signal py is input to the A/D converter A/D3 of the CPU 21 and also converted to digital signal, whereupon the CPU 21 determines the present position Pn ($pdx_n$, $pdy_n$) of the movable part 30a with the input signal.

In step S703, it is determined whether the value of the dust-removal time parameter CNT is less than or equal to 65 ms. In the case that the value of the dust-removal time parameter CNT is less than or equal to 65 ms, steps S704 to S706 are commenced. In the case that the value of the dust-removal time parameter CNT is not less than or equal to 65 ms, the process proceeds to step S710.

Steps S704 to S706 process the "a" trajectory which drives the movable part 30a to the center of the fixed part 30b.

In the step S704, the position Sn (Sxn, Syn) where the movable part 30a (the imaging unit 39a) should be moved is set to the center of the movement range of the movable part 30a.

In step S705, the driving force Dn that moves the movable part 30a is calculated using the position Sn (Sxn, Syn) that was determined in step S704 according to the present position Pn (pdxn, pdyn). This calculation is the same as the one in step S59 in the timer interruption process.

In step S706, the movable part 30a is moved by executing the same process as in step S60 in the timer interruption process. Then, the dust-removal process ends, and the process returns to the timer interruption process (subroutine return).

The timer interruption process is executed every millisecond (the second periods). Therefore, the dust-removal process is also repeatedly executed until the dust-removal state parameter GP is set to zero in step S16 of the main process.

When the dust-removal process commences again, the value of the dust-removal time parameter CNT is increased by one, making it two, in step S701. Then, steps S702 and S703 are executed. In the step S703, it is determined whether the value of the dust-removal time parameter CNT is less than or equal to 65 ms. At this point, the value of the dust-removal time parameter CNT is two. Therefore, the process proceeds to step S704, and then ends after commencing steps S704 to S706 (subroutine return). After that, the dust-removal process is executed again in the timer interruption process.

Steps S701 to S706 are repeatedly executed until the dust-removal time parameter CNT becomes greater than 65 ms. In the case that the dust-removal time parameter CNT becomes greater than 65 ms in step S703, the process proceeds to step S710. Note that the movable part 30a is placed in the center of the fixed part 30b.

The maximum time interval which is needed to move the movable part 30a from the present position to the center of the fixed part 30b is 65 ms. In other words, the time interval calculated by adding the average time interval which is needed to move the movable part 30a from the corner to the center of the fixed part 30b and the error time interval of the individual difference of the anti-shake unit 30 is 65 ms. Therefore, the threshold value of the dust-removal time parameter CNT is set to 65 ms. In the case the dust-removal time parameter CNT is less than or equal to 65 ms, there is a possibility that movable part 30a has not yet arrived the center of fixed part 30b. When the dust-removal time parameter CNT is greater than 65 ms, the movable part 30a is in the center of fixed part 30b.

In step S710, it is determined whether the dust-removal time parameter CNT is less than or equal to 115 ms. In the case that the dust-removal time parameter CNT is less than or equal to 115 ms, steps S711 to S715 is commenced. In the case that the dust-removal time parameter CNT is not less than or equal to 115 ms, the process proceeds to step S720.

Next, the process of steps S711 to S714 is described. Steps S711 to S714 process the "b" trajectory which strikes the movable part 30a against the lower boundary of the fixed part 30b.

In step S711, the value of the second PWM duty dyl is set to −DD. The value DD, i.e., the absolute value |+DD| and |−DD| is set so that the acceleration of the movable part 30a at the point in time when the movable part 30a is moved to and struck against the boundary of the movement range of the movable part 30a is increased to the degree where the dust on the movable part 30a can be removed by the shock of the impact.

In step S712, the coordinate of position Sn in the x-direction, Sxn, where the movable part 30a should be moved in the x-direction, is set to the center of the movement range of the movable part 30a in the x-direction.

In step S713, the first driving force Dxn (the first PWM duty dx) is calculated on the basis of the coordinate of position Sn in the x-direction, Sxn, determined in step S712, and the coordinate of the present position Pn in the x-direction, pdxn. The first driving force Dxn, i.e., the driving force Dn which moves the movable part 30a in the x-direction, is needed to move the movable part 30a by providing current to the first driving coil unit 31a.

In step S714, the first and second driving coil units 31a and 32a are respectively driven by applying the first and second PWM duties dx and dy to the driver circuit 29, so that the movable part 30a is moved. The movable part 30a is moved towards the center of the movable range along the x-direction, and fixed on the center of the movable range along the x-direction (refer to FIG. 9). Additionally, the movable part 30a is moved towards the bottom of the fixed part 30b, i.e., along the positive y-direction. After that, the process ends (subroutine return), and the dust-removal process is executed again in the timer interruption process.

When the dust-removal process commences again, the value of the dust-removal time parameter CNT is increased by one so as to become 67, in step S701. Then, steps S702, S703, and S710 to S714 are executed. Thus, steps S701 to S703 and S701 to S714 are executed until the value of the dust-removal time parameter CNT is greater than 115 ms. In the case that the value of the dust-removal time parameter CNT is greater than 115 ms in step S710, the process proceeds to step S720.

By iterating steps S701 to S714, the movable part 30a is fixed so as to contact the bottom side of the fixed part 30b after the movable part 30a strikes the bottom side of the fixed part 30b.

Next, the reason why the threshold value of the dust-removal time parameter CNT is set to 115 ms, is described. The maximum time interval from the moment that the movable part 30a starts moving from the present position to the moment that bounce from the collision of the movable part 30a against the top or bottom of the fixed part 30b settles is 50 ms. Specifically, the maximum time interval calculated by adding: the average time interval from the moment that the movable part 30a starts moving at the center of the fixed part 30b to the moment that it arrives at the top or bottom of the fixed part 30b, the error time interval of the individual difference of the anti-shake unit 30, and the time interval that bounce created by striking the movable part 30a against the fixed part 30b is settled, is 50 ms. The threshold value 115 ms is calculated by adding the maximum time interval 50 ms and the time interval from the moment that the dust-removal process starts to the moment that the "b" trajectory is started. In the case the dust-removal time parameter CNT is less than or equal to 115 ms, there is a possibility that movable part 30a has not yet reached top or bottom side of fixed part 30b. When the dust-removal time parameter CNT is greater than 115 ms, the movable part 30a is at the top or bottom side of fixed part 30b.

In the next step, S720, it is determined whether the dust-removal time parameter CNT is less than or equal to 165 ms. In the case that the dust-removal time parameter CNT is less than or equal to 165 ms, steps S721, and S712 to S714 are commenced. In the case that the dust-removal time parameter CNT is not less than or equal to 165 ms, the process proceeds to step S730.

Next, the process of steps S721, and S712 to S714 is described. These steps process the "c" trajectory which strikes the movable part 30a against the bottom of the fixed part 30b.

In step S721, the value of the second PWM duty dy is set to +DD.

Figure 9:
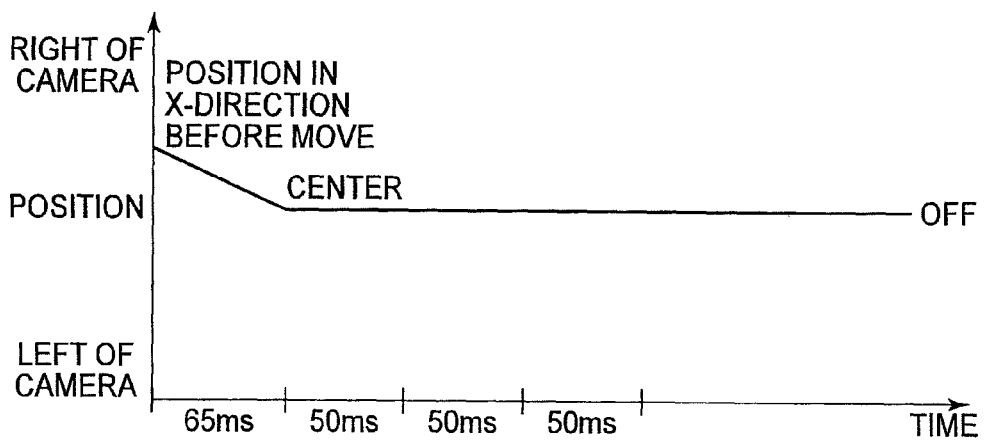
FIG. 9 shows the trajectory of the movable part in the x-direction during the dust-removal process.

Processes similar to those described above commence in steps S712 to S714, so that the movable part 30a is returned to the center of the movable range along the x-direction after it is moved towards the center of the movable range along the x-direction (refer to FIG. 9). Additionally, the movable part 30a is moved towards the top of the fixed part 30b. After that, the process ends (subroutine return), and the dust-removal process is executed again in the timer interruption process.

When the dust-removal process commences again, the value of the dust-removal time parameter CNT is increased by one so as to become 117 ms, in step S701. Then, steps S702, S703, S720, S721, and S712 to S714 are executed. Thus, these steps are iterated until the value of the dust-removal time parameter CNT is greater than 165 ms. In the case that the value of the dust-removal time parameter CNT is greater than 165 ms in step S720, the process proceeds to step S730.

By executing these steps, the movable part 30a is fixed so as to contact the top side of the fixed part 30b after the movable part 30a strikes the top side of the fixed part 30b.

The reason why the dust-removal time parameter CNT is set to 165 ms is omitted because it was described above. In the case the dust-removal time parameter CNT is less than or equal to 165 ms, there is a possibility that movable part 30a has not yet arrived at the top side of fixed part 30b. In the case the dust-removal time parameter CNT is greater than 165 ms, the movable part 30a is fixed so as to contact the top side of fixed part 30b.

In next step S730, it is determined whether the dust-removal time parameter CNT is less than or equal to 215 ms. In the case that the dust-removal time parameter CNT is less than or equal to 215 ms, steps S711 to S714 are commenced. In the case that the dust-removal time parameter CNT is not less than or equal to 215 ms, the process proceeds to step S740.

The descriptions concerning steps S711 to S714 are omitted because they are described above. Steps S711 to S714 process the "d" trajectory which strikes the movable part 30a against the bottom side of the fixed part 30b. By executing these steps, the movable part 30a is fixed so as to contact the bottom side of the fixed part 30b after the movable part 30a strikes the bottom side of the fixed part 30b.

The reason why the dust-removal time parameter CNT is set 215 ms is omitted because it is described above. In the case the dust-removal time parameter CNT is less than or equal to 215 ms, there is a possibility that movable part 30a is not yet put in the bottom side of fixed part 30b. In the case the dust-removal time parameter CNT is greater than 215 ms, the movable part 30a is fixed so as to contact the bottom side of fixed part 30b.

In next step S740, it is determined whether the dust-removal time parameter CNT is less than or equal to 245 ms. In the case that the dust-removal time parameter CNT is less than or equal to 245 ms, steps S721 and S712 to S714 are commenced. Therefore, the "c2" trajectory which strikes the movable part 30a against the top side of the fixed part 30b is processed.

The time interval from the moment of completion of the "d1" trajectory to the moment of the completion of the "c2" trajectory is set to 30 ms which is shorter than the 50 ms is omitted in the "d1" trajectory. The vibration frequency of the movable part 30a can be changed by shortening the time interval from the moment of completion of the "d1" trajectory to the moment of the completion of the "c2" trajectory. It is necessary to shake the movable part 30a at a vibration frequency corresponding to the weight of the dust particles so as to efficiently remove them from an image sensor and its cover. By changing the vibrational frequency of the movable part 30a, the drive device can remove not only dust particles which can be removed by 30 ms of vibration, but also dust particles which can be removed by 50 ms of vibration frequency.

In the next step, S750, it is determined whether the dust-removal time parameter CNT is less than or equal to 275 ms. In the case that the dust-removal time parameter CNT is less than or equal to 275 ms, steps S711 to S714 are commenced. Therefore, the "d2" trajectory which strikes the movable part 30a against the bottom side of the fixed part 30b is processed so that the movable part 30a contacts the bottom side of the fixed part 30b. The time interval from the moment of completion of the "c2" trajectory to the moment of the completion of the "d2" trajectory is set 30 ms. In the case the dust-removal time parameter CNT is not less than or equal to 275 ms, the process proceeds to step S760.

In next step S760, it is determined whether the dust-removal time parameter CNT is less than or equal to 290 ms. In the case that the dust-removal time parameter CNT is less than or equal to 290 ms, steps S721 and S712 to S714 are commenced. Therefore, the "c3" trajectory which strikes the movable part 30a against the top side of the fixed part 30b is processed, so that the movable part 30a contacts the top side of the fixed part 30b. In the case the dust-removal time parameter CNT is not less than or equal to 290 ms, the process proceeds to step S770.

The time interval from the moment of completion of the "d2" trajectory to the moment of the completion of the "c3" trajectory is set to 15 ms, which is shorter than the 30 ms taken in the "d2" trajectory. According to change the vibration frequency of the movable part 30a, the drive device can remove not only dust particles which can be removed by 15 ms of vibration, but also dust particles which can be removed by 50 ms and 30 ms of vibration.

In next step S770, it is determined whether the dust-removal time parameter CNT is less than or equal to 305 ms. In the case that the dust-removal time parameter CNT is less than or equal to 305 ms, steps S711 to S714 are commenced. The time interval from the moment of completion of the "c3" trajectory to the moment of the completion of the "d3" trajectory is set 15 ms. Therefore, the "d3" trajectory which strikes the movable part 30a against the bottom side of the fixed part 30b is processed, so that the movable part 30a contacts the bottom side of the fixed part 30b. In the case the dust-removal time parameter CNT is not less than or equal to 305 ms, the process proceeds to step S780.

In the next step S780, the movable part 30a is in the drive OFF state. Therefore, driving force is not applied to the movable part 30a, so that the movable part 30a settled on the bottom of the fixed part 30b by gravity.

According to this embodiment, the vibrational frequency of the movable part 30a may be changed, so that the drive device can effectively remove dust particles of various weights.

Additionally, the time interval required to execute the dust-removal process may be shortened because the time interval from the moment of striking the movable part 30a against the fixed part 30b to the moment of moving the movable part 30a the next time shortens.

Note that the dust-removal time parameter CNT is increased in steps, or in random order (in regular order if the dust-removal time parameter CNT is shortened in steps), in the present embodiment.

Note that the impact of the movable part 30a and the fixed part 30b is not limited to three times, but may be any number of times greater than or equal to one. In that case, steps S710 to S770 are executed according to the number of impacts.

The movable part 30a does not strike the top and the bottom of the fixed part 30b alternately, but may strike repeatedly either the top or bottom of the fixed part 30b.

In the dust-removal operation, the movable part 30a may be held at the center in the y-direction and moved in the x-direction. The movable range of the movable part 30a in the x-direction is longer than in the y-direction.

Furthermore, the position to which the movable part 30a is moved when the dust-removal operation commences is not limited to the center of the movement range of the movable part 30a, but may be any position where the movable part 30a does not make contact with the boundary of the movement range of the movable part 30a.

Moreover, it is explained that the hall element is used for position detection as the magnetic-field change-detecting element. However, another detection element, an MI (Magnetic Impedance) sensor such as a high-frequency carrier-type magnetic-field sensor; a magnetic resonance-type magnetic-field detecting element; or an MR (Magneto-Resistance effect) element may be used for position detection purposes. When one of either the MI sensor, the magnetic resonance-type magnetic-field detecting element, or the MR element is used, the information regarding the position of the movable part 30a can be obtained by detecting the magnetic-field change, similar to using the hall element.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2008-055969 (filed on Mar. 6, 2008), which is expressly incorporated herein, by reference, in its entirety.

The invention claimed is:

1. A drive device comprising:
   a movable part;
   a fixed part that is provided within a movement range of said movable part; and
   a drive part that drives said movable part in a first direction so as to strike said fixed part;
   said drive part driving said movable part to and fro along the first direction alternately for different time intervals so as to strike said fixed part.

2. A drive device according to claim 1, wherein the interval time shortens whenever said moving part is driven.

3. A drive device according to claim 1, wherein the interval time gets longer whenever said moving part is driven.

4. A drive device according to claim 1, wherein said fixed part has a frame facing opposite the first direction, and said movable part strikes the frame.

5. A drive device according to claim 1, further comprising a second drive part suppressing the movement of said movable part in the second direction, wherein said second drive part holds said movable part in the second direction when said first drive part drives said movable part.

6. An image-capturing device comprising:
   a drive device having a movable part, and a fixed part that is provided within a movement range of said movable part, and a drive part that drives said movable part in a first direction so as to strike said fixed part, wherein said drive part drives said movable part to and fro along the first direction alternately for different time intervals so as to strike said fixed part;
   wherein said fixed part holds an image sensor.

7. The image-capturing device according to claim 6, wherein said drive part may drive said movable part in a second direction on the imaging surface, isolated from the first direction on the imaging surface of the imaging sensor, and said drive part is a shake-correction part which corrects the shake of said imaging sensor by driving said movable part in the first and second directions within a shake-correction area, said fixed part being provided outside the shake-correction area, said movable part striking said fixed part beyond the shake-correction area.

8. The image-capturing device according to claim 6, wherein an imaging area of the imaging sensor is covered by a covering part.

* * * * *